ELECTRONIC STORAGE DEVICES

Filed Oct. 30, 1950 2 Sheets-Sheet 1

INVENTORS:
F. C. WILLIAMS &
T. KILBURN
ATTORNEYS:
Morse & Hall

INVENTORS:
F.C. WILLIAMS &
T. KILBURN
ATTORNEYS:
Moore & Hall

United States Patent Office 2,809,325

Patented Oct. 8, 1957

2,809,325

ELECTRONIC STORAGE DEVICES

Frederic Calland Williams, Timperley, and Tom Kilburn, Davyhulme, Manchester, England, assignors to National Research Development Corporation, London, England Application October 30, 1950, Serial No. 192,852

Claims priority, application Great Britain November 14, 1949

9 Claims. (Cl. 315—26)

Figure 1:
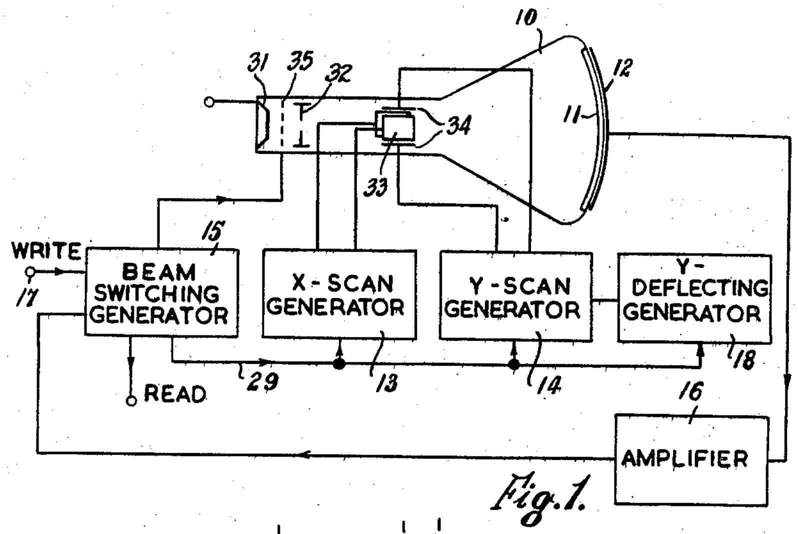

This invention relates to electronic storage devices of the type employing a cathode ray tube and in which a surface of an insulator, hereinafter referred to as a screen, is bombarded by the cathode ray beam to set up on the surface electric charges representing the information to be stored. Examples of such devices are described in the specifications of copending U. S. patent applications Serial No. 790,879, filed December 10, 1947, for Apparatus for Storing Trains of Pulses; Serial No. 50,136, filed September 20, 1948, for Electric Storage Apparatus; Serial No. 165,262, filed May 31, 1950, for Electronic Digital Computer which is now U. S. Patent 2,769,935, granted November 6, 1956; and Serial No. 165,622, filed June 2, 1950, for Electric Information Storage Means. The storage devices with which this invention is concerned are further of the type which are operated with a secondary emission ratio greater than one so that a positive charge is produced by bombarding a spot on the screen.

Devices of this type depend in principle on the production on the screen of two (or more) different states of charge to represent the information to be stored. In the binary system the digits 0 and 1 are represented by two states of charge and in the systems described in the above-mentioned patent specifications two phases of irradiation of the screen are used of which the first is an exploratory phase during which the stored information is read and the second a modifying or refilling phase. The size of the signal produced depends upon the magnitude of the change of charge produced by the exploratory irradiation. It is therefore desirable that, for a given area of screen that can be allocated for storing a certain amount of information, the largest possible proportion of the area should be allocated to storing information which indicates what the digit is and that as little as possible of the available area should be used to provide secondary electrons for modifying or refilling, when required.

According to the present invention, there is provided an electronic storage device of the type specified comprising means for sweeping the beam along a path over the screen to generate a positive charge along the path, the velocity of sweeping being high enough to prevent appreciable cancellation of the charge behind the beam by secondary emission, the said means, or additional means, being adapted to sweep the beam subsequently along or near to the said path at a lower velocity such that the secondary emission cancels all, or a substantial part, of the charge produced during the first sweep, and means adapted to cause or permit the occurrence of the said subsequent sweeping or to prevent the occurrence of the said second sweeping according to the nature of the information to be recorded.

According to a modification of the invention the first-named sweeping of the beam is at a relatively low velocity such that the secondary emission partially cancels the positive charge behind the beam and the second sweeping, when required, takes place at a sufficiently high velocity to prevent appreciable cancellation of the charge behind the beam.

It will be obvious that the invention is not limited to sweeping along straight paths and among the advantages of this invention are (1) For a given area of screen the maximum amount of screen is used for recording te information and the entire area available for recording information is irradiated for either of two kinds of information;

(2) A better discrimination against spurious signals caused by screen imperfection results from the use of this invention. The screen of the cathode ray tube may contain small particles of carbon, which has a secondary emission ratio less than unity for all primary electron velocities or the screen material may be perforated in which case the operative screen material is glass with a much lower inversion point than the true screen material. In these cases small regions of the screen under electron bombardment may be at potentials which are very much negative with respect to the remainder of the screen if a high accelerating voltage is used.

In known systems of the type specified, the operation of the storage system is based on the fact that the potential distribution at a first region of the screen is dependent on whether an adjacent region within the critical distance has, or has not, been bombarded since said first region of the screen was last bombarded. If such an adjacent region has been bombarded the potential distribution at said first region is changed by a refilling operation effected by secondary electrons arriving at said first region from the bombarded point. If however, a screen imperfection exists between said first region and said adjacent region some of the secondary electrons may be prevented from reaching said first region by the potential barrier produced by the imperfection. Said first region, in effect, always operates as a spot which has not had bombardment in its vicinity. In the above-mentioned systems the effect is, therefore, that if the accelerating voltage is high and the imperfection occupies an area of the screen sufficiently large when compared with the spot area it is impossible to write a "dash" or a "1" into the store at said first region.

It will be obvious that using the present invention the results of screen imperfections are largely nullified since the whole area used in recording information is bombarded during the refilling or second sweeping stage so that, even if one or more screen imperfections are found in the path, part of the path will still be re-filled.

Figures 3, 4:
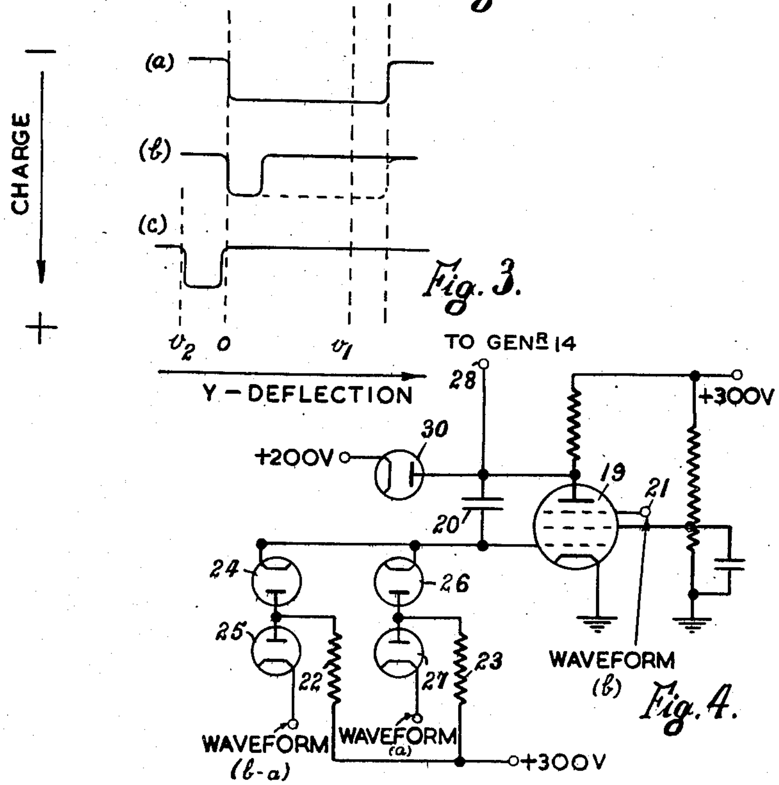
Figure 2:
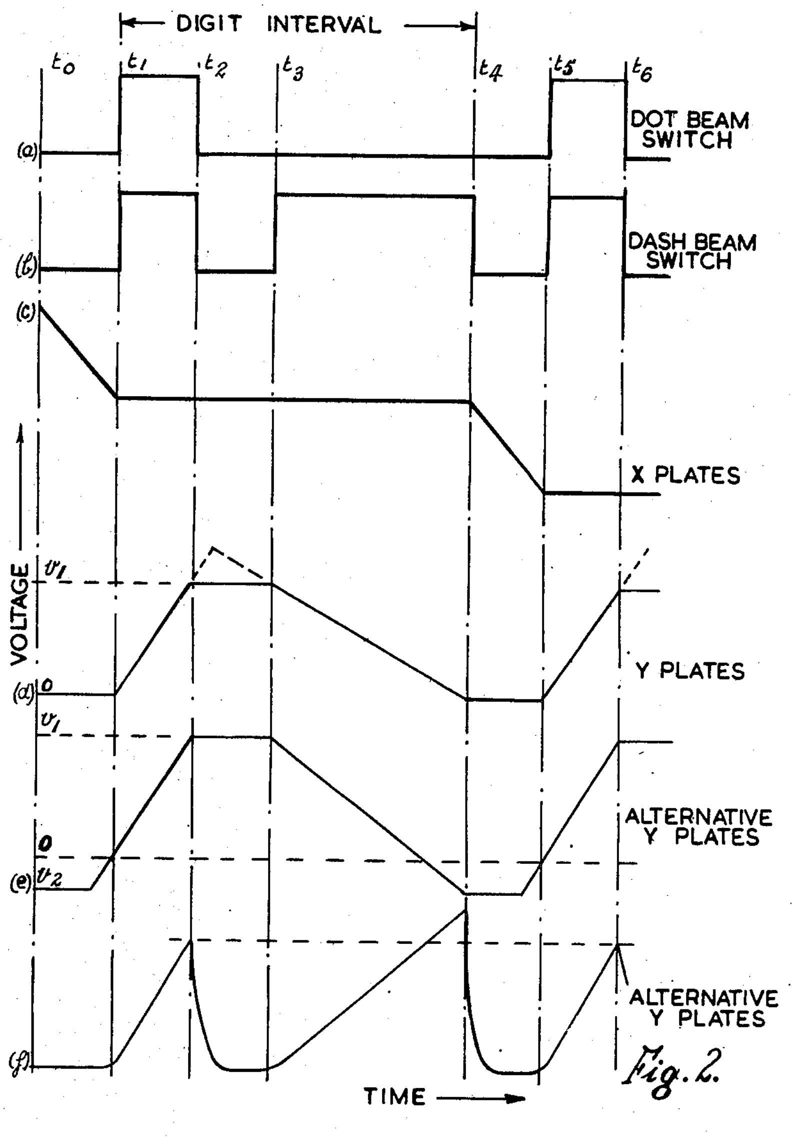

The invention will be described with the reference to the accompanying drawings in which Fig. 1 shows a diagrammatic representation of the relevant parts of one embodiment of the invention, Fig. 2 shows wave forms associated with this embodiment, Fig. 3 is a diagram illustrating further wave forms, and Fig. 4 shows a diagram of a circuit suitable for use in Fig. 1 for generating a Y-deflecting voltage.

Referring to Fig. 1, a cathode ray tube 10 has an electron gun including a cathode 31 and means represented by a conventional focusing electrode 32 for directing electrons from the cathode 31 in a beam onto a phosphor screen 11 on the inside of the end wall, a signal plate 12 being provided on the outside of this wall. The cathode ray beam is caused to scan a raster upon the screen 11 by suitable saw-tooth deflecting voltages generated by an X-scan generator 13 and a Y-scan generator 14 and applied to X and Y-deflecting plates 33 and 34. A small part of the deflecting voltage applied to the X plates is shown in Fig. 2(*c*) from which it is seen that in the arrangement to be described the beam is brought to rest during the interval $t_1$ to $t_4$ allocated to the storage of a digit. It is not essential that this should be so and a continuous movement of the beam in the X direction may be employed. The digit interval is followed by a space $t_4$ to $t_5$ after which a new digit interval begins: the recurrent digit period is thus from $t_1$ to $t_5$.

The beam is arranged to be switched on and off by a beam switching generator 15 whose output is applied to the control electrode 35 of the tube 10. The waveforms from the generator 15 may have either of two forms shown at *a* and *b* in Fig. 2, the former being the dot waveform, which may represent 0, and the latter the dash waveform, which may represent 1. The selection of the waveform *a* or *b* to be applied is made by signals applied from the signal plate 12 through an amplifier 16, when regeneration is required or by write signals applied at 17 from a computor or other external controlling means. The way in which the parts 12, 16, 15 and 17 may be constructed and may operate is fully described in the prior specifications already referred to and as it is not directly relevant to an understanding of the present invention will not be further described.

Suitable synchronising signals are applied by a lead 29 from generator 15 to the scan generators 13 and 14 and also to a Y-deflection generator 18 in order to maintain these generators in proper step.

The generator 18 serves to superimpose upon the linear sawtooth Y-scan waveform from 14 a waveform which may have the form shown in Fig. 2(*d*). First assuming that the dot waveform *a* of Fig. 2 is applied to switch the beam, whilst the beam is switched on it is deflected by the waveform *d* of Fig. 2 in a direction at right angles to the scanning line by an amount corresponding to a voltage $v_1$. The slope of the waveform from $t_1$ to $t_2$ is arranged to be such that the beam moves at a speed which is so high that the positive charge generated along the path of the beam due to emission of secondary electrons is not appreciably cancelled or reduced by these secondary electrons falling back into the path behind the beam. The condition of charge produced is then as indicated at *a* in Fig. 3 where Y-deflection is represented as measured by the voltage $v_1$ to which it is proportional. In the case of the dot waveform now being considered the beam is switched off from $t_2$ to $t_5$ and the part of the waveform *d* of Fig. 2 over this time interval therefore has no effect.

When the dash waveform of Fig. 2(*b*) is used, the charge of Fig. 3(*a*) is first produced by a first switching on and off of the beam at $t_1$ and $t_2$ respectively and subsequently, after a pause from $t_2$ to $t_3$, the beam is again switched on and off at $t_3$ and $t_4$ respectively and thus remains switched on whilst it is moved back along its original path. This movement is at a considerably slower speed than that during $t_1$ to $t_2$ as evidenced by the smaller slope of the waveform from $t_3$ to $t_4$ and the speed of the return movement is made such that the positive charge behind the beam is at least partially neutralised by secondary emission. The charge condition may then be changed to that shown in full lines in Fig. 3(*b*). Thus one type of information, for instance 0, is represented by the charge condition of Fig. 3(*a*) and the other type of information, namely 1, is represented by the condition of Fig. 3(*b*).

It will be seen that the generator 18 constitutes a beam deflection control means coupled to the Y-deflecting means 34 through the Y-scan generator 14 and providing two different successive sweep voltages. Further control means by which the second of these sweep voltages can be made effective or ineffective are provided in this case by the beam switching generator 15 controlled, for regeneration, by signals from the signal plate 12 and, for writing in new information, by signals applied at 17, the generator 15 feeding control voltages to the beam intensity control grid 35. Obviously the same result is obtained if the voltages from 12 or 17 as the case may be are applied to switch the beam deflection control means 18 into and out of operation.

An alternative waveform which may be applied to the Y plates is indicated by the dotted lines in Fig. 2(*d*). As the beam is always turned off during this period $t_2$ to $t_3$ this waveform may be used: the only danger is that of cross talk between adjacent lines if the beam is not completely turned off in the period $t_2$ to $t_3$.

In order to produce a neutralising of the positive charge along the whole of the path of Fig. 3(*a*) the Y-deflecting waveform of Fig. 2(*e*) may be used. It is seen that at the time $t_4$, at the end of the return sweep of the beam, the beam is moved to $v_2$ which is beyond its starting point 0. The charge condition then produced is indicated in Fig. 3(*c*).

The waveforms of Fig. 2(*d*) and (*e*) may be generated by sawtooth wave generators with suitable amplitude limiters.

In the arrangements so far described, the two sweeps have been in opposite directions. By using a Y-deflecting voltage as shown in Fig. 2(*f*) both sweeps are in the same direction. A circuit whereby the waveform of Fig. 2(*f*) (although of opposite sign) may be generated is shown in Fig. 4. The waveforms applied at various points in this circuit are given the references of the waveforms in Fig. 2.

In Fig. 4, a pentode 19 has a condenser 20 between its anode and control grid and operates as a Miller integrator when it is rendered conducting by a positive pulse upon its suppressor grid. These positive pulses applied at terminal 21 are provided by the waveform (*b*). The valve is therefore operative from $t_1$ to $t_2$, $t_3$ to $t_4$, $t_5$ to $t_6$ and so on. Two grid leaks 22 and 23 of different values are rendered operative and inoperative by means of diodes 24, 25 and 26, 27 respectively. The waveform *a* is applied to the cathode of diode 27 and the waveform *b*—*a* (which is positive only from $t_3$ to $t_4$) is applied to the cathode of diode 25. These voltages are applied from rest levels such that the diodes 25 and 27 are conducting except when the said voltages are positive. So long as diodes 25 and 27 are conducting the diodes 24 and 26 are held cut off and the later diodes only conduct when the diodes 25 and 27 are made insulating. The output from the circuit is obtained at a terminal 28 and may be applied to the Y-deflecting plates 34 through the generator 14 as in Fig. 1.

From $t_0$ to $t_1$ valve 19 is cut off and the voltage at 28 remains constant at a maximum value of 200 volts as determined by a diode 30. At $t_1$ valve 19 is switched on, the diode 25 is conducting making diode 24 insulating and rendering the leak 22 inoperative and the diode 27 is insulating thus rendering the diode 26 conducting and the leak 23 operative to determine, with the Miller capacitance, the rate of discharge of the condenser 20. At $t_2$ the valve 19 is cut off, the discharge ceases and the charge on the condenser 20 rises again to 200 volts. It remains at this value until $t_3$ when the valve 19 is again switched on and the grid leak 22 is rendered operative to determine the rate of discharge from $t_3$ to $t_4$. It is arranged that the discharge is to a lower value than before (thus going beyond the dotted line in Fig. 2(*f*)) for the reason given with reference to Fig. 3(*c*). At $t_4$ the valve 19 is again cut off and charging up of the condenser 20 to 200 volts completes the cycle.

According to which of the two grid leaks 22 and 23 is the greater it will be determined which of the two rates of sweep is the greater. In Fig. 2(*f*) the first sweep is at the higher speed but the reverse arrangement may be used, the switching waveforms being suitably modified. When the first sweep is at the higher speed, the path followed during the second sweep may be slightly displaced from that during the first sweep so long as it is near enough for secondary emission generated in the second sweep to pass to the first path. This displacement of path occurs if the beam is not held stationary from $t_1$ to $t_4$ as shown in Fig. 2(*c*) but moves at least during part of this time. When the second sweep is the faster the paths should be the same.

We claim:

1. An electronic information-storing device, comprising an electrostatic storage surface, a source of electrons, means to direct said electrons in a beam on to said surface, beam intensity control means for said beam, beam-deflecting means adjacent said beam, a source of deflecting voltage coupled to said deflecting means to direct said beam toward a plurality of discrete areas of said surface in succession, beam deflection control means including a further source of deflecting voltage coupled to said deflecting means and operable when said beam is directed on to each of said areas to provide two different, successive, sweep voltages to deflect said beam along a path on each of said areas in two successive sweeps of different velocities, and further control means coupled to at least one of said beam control means to alternatively suppress and permit the second of each pair of said sweeps according to the nature of the information to be stored.

2. An electronic information-storing device, comprising an electrostatic storage surface, a source of electrons, means to direct said electrons in a beam on to said surface, beam intensity control means for said beam, beam deflecting means adjacent said beam, a source of deflecting voltage coupled to said deflecting means to direct said beam on to a plurality of discrete areas of said surface in succession, beam deflection control means including a further source of deflecting voltage coupled to said deflecting means and operable when said beam is on each of said areas to provide a first sweep voltage to deflect said beam at a first velocity and to provide a subsequent sweep voltage to deflect said beam at a second velocity lower than said first velocity, and further control means coupled to at least one of said beam control means to alternatively suppress and permit said second sweeping according to the nature of the information to be stored.

3. An electronic information-storing device, comprising an electrostatic storage surface, a source of electrons, means to direct said electrons in a beam toward said surface, beam intensity control means for said beam, beam deflecting means adjacent said beam, a source of deflecting voltage connected to said deflecting means to direct said beam on to a plurality of discrete areas of said surface in succession, beam deflection control means including a further source of deflecting voltage coupled to said deflecting means and operable when said beam is on each of said areas to provide a first sweep voltage to deflect said beam at a first velocity and to provide a subsequent sweep voltage to deflect said beam at a second velocity higher than said first velocity, and further control means coupled to at least one of said beam control means to alternatively suppress and permit said second sweeping according to the nature of the information to be stored.

4. An electronic information-storing device comprising an electrostatic storage surface, a source of electrons, means to direct said electrons in a beam on to said surface, beam intensity control means for said beam, beam deflecting means adjacent said beam, a source of deflecting voltage connected to said deflecting means to direct said beam on to a plurality of discrete areas of said surface in succession, a second beam deflecting means adjacent said beam, a source of further deflecting voltage coupled to said second deflecting means, said source of further deflecting voltage being operable when said beam is on each of said areas to provide two, different, successive sweep voltages to deflect said beam along a path on each of said areas in two successive sweeps of different velocities, and control means coupled to said beam intensity control means alternatively to suppress and permit the second of each pair of said sweeps according to the nature of the information to be stored.

5. An electronic information-storing device, comprising an electrostatic storage surface, a source of electrons, means to direct said electrons in a beam on to said surface, a beam intensity control electrode for said beam, a source of control voltage, means coupling the last-named source to said electrode, beam-deflecting means adjacent said beam, a source of deflecting voltage connected to said deflecting means to direct said beam on to a plurality of discrete areas of said surface in succession, a further source of deflecting voltage generating two, successive, sweep voltages having voltage/time characteristics of different slopes, means coupling said further source to said deflecting means, and control means in at least one of said coupling means operable when said beam is on each of said areas alternatively to prevent and permit sweeping of said beam over said surface during the second of said sweep voltages according to the nature of the information to be stored.

6. An electronic information-storing device, comprising an electrostatic storage surface, a source of electrons, means to direct said electrons in a beam on to said surface, first and second beam deflecting means adjacent said beam, a source of deflecting voltage connected to each of said first and second deflecting means to direct said beam on to a plurality of discrete areas of said surface in succession, a further source of deflecting voltage coupled to one of said beam deflecting means and operable when said beam is on each of said areas to provide a first sweep voltage to deflect said beam at a first velocity and to provide a subsequent sweep voltage to deflect said beam at a second velocity higher than said first velocity, and beam intensity control means operable when said beam is on each of said areas alternatively to prevent and permit said beam to reach the area during the second of said sweeps according to the nature of the information to be stored.

7. An electronic information-storing device, comprising an electrostatic storage surface, a source of electrons, means to direct said electrons in a beam on to said surface, beam intensity control means, a source of two successive beam switching voltages, one extending over a first interval of time and the second extending over an interval of time following the first interval, means coupling said source to said intensity control means to apply each of said beam switching voltages to said beam intensity control means to switch said beam on during said two intervals of time respectively, beam deflecting means, a source of two successive deflecting voltages occurring during said switching voltages respectively, said deflecting voltages being of different slopes, means to apply said deflecting voltages to said deflecting means to deflect said beam at different velocities during said two intervals of time, and means coupled to said source for alternatively preventing and permitting the application of said second beam switching voltage according to the nature of the information to be stored.

8. An electronic information-storing device as defined in claim 1 further characterized in that said further source of deflecting voltage deflects said beam in a direction substantially perpendicular to the direction of deflection caused by said first named source of deflecting voltage.

9. A method of storing information electrostatically on a storage surface, comprising the steps of storing a first item of information on one area of said surface by scanning an electron beam over said area at a first velocity, and storing a second item of information on a second area of said surface by scanning the electron beam over the last named area at said first velocity and subsequently scanning the electron beam over the last named area at a second velocity differing from said first velocity.

References Cited in the file of this patent

UNITED STATES PATENTS

| | | |
|---|---|---|
| 2,093,157 | Nakashima et al. | Sept. 14, 1937 |
| 2,402,270 | Altman | June 18, 1946 |
| 2,508,408 | Liebson | May 23, 1950 |
| 2,549,072 | Epstein | Apr. 17, 1951 |

OTHER REFERENCES

Rider: "The Cathode-Ray Tube at Work," John F. Rider Publisher Inc., 1935.